United States Patent

Hoffman

[11] 3,912,927
[45] Oct. 14, 1975

[54] OPTO-MECHANICAL DEVICE FOR PHASE SHIFT COMPENSATION OF OSCILLATING MIRROR SCANNERS

[75] Inventor: Richard G. Hoffman, II, Allen, Tex.

[73] Assignee: Texas Instruments Incorporated, Dallas, Tex.

[22] Filed: Nov. 13, 1972

[21] Appl. No.: 305,763

[52] U.S. Cl. .............. 250/234; 250/334; 250/347; 350/6; 350/7
[51] Int. Cl. .................... G01t 1/16; G02b 17/00
[58] Field of Search ........ 350/1, 6, 7; 250/347, 234, 250/334

[56] References Cited
UNITED STATES PATENTS
| | | | |
|---|---|---|---|
| 2,989,643 | 6/1961 | Scanlon | 250/334 X |
| 3,278,746 | 10/1966 | Fiat | 250/253 |
| 3,447,852 | 6/1969 | Barlow | 350/7 |

*Primary Examiner*—James W. Lawrence
*Assistant Examiner*—T. N. Grigsby
*Attorney, Agent, or Firm*—Harold Levine; Rene' E. Grossman; Alva H. Bandy

[57] ABSTRACT

A radiant energy display system incorporating a reflecting surface gimbal mounted for rotation about scan and interlace axis, said scan and interlace axis positioned less than 90° from one another. Incoming radiant energy is scanned by the reflecting surface and reflected to a detector array which is responsive to that energy. Video processing circuitry interconnecting the detector array with a light source array modulates the light source array which thereby emits a modulated visible beam. This beam of visible light in turn impinges upon the back portion of the reflecting surface. A lens is attached to the gimbal in a line of sight path to the back portion of the reflecting surface for movement in accordance with the interlace movement of the gimbal. Light reflected from the back portion of the reflecting surface passes through the lens, whose movement with the interlace gimbal compensates the image for electronic phase shift. The electronic phase shift is defined as the amount of offset caused by the finite time required to propagate a signal from the input of the video processing circuitry to its output. The image formed by the lens provides a scan representative of the field of view for an erect image telescope or other type display.

7 Claims, 15 Drawing Figures

OPTO-MECHANICAL DEVICE FOR PHASE SHIFT COMPENSATION OF OSCILLATING MIRROR SCANNERS

This invention relates to an optical system for collecting and focusing radiant energy and more particularly, to an apparatus for scanning radiant energy.

In scanning systems for scanning radiant energy presently using a mirror as the scanning element, the front surface of the mirror scans the infrared energy and the rear surface of the mirror scans the visible energy. The mirror is mounted in a two axes gimbal and oscillated therein to produce a raster scan. In this arrangement the mirror is rotated clockwise about a vertical axis to produce a horizontal scan path from a first point to a second point, then rotated about a horizontal axis disposed either 90° or less to the vertical axis to produce a predetermined vertical movement, and then rotated counter-clockwise from the second point to the first point to produce a return horizontal scan about the first vertical axis. The image formed on the display side of the scan mirror on a clockwise rotation is not aligned with the image formed on the scan mirror's counter-clockwise rotation. The amount of offset is caused by the finite time required to propagate a signal from the input of the electronics to the output of the electronics, this phenomenon is often referred to as electronic phase shift. The phase shift is present whether or not the system is an interlacing system. In a system with no interlace, the phase shift makes an object such as, for example, a line, appear wider than the true image size; in a system with interlace, the phase shift makes the line appear as a jagged, dotted line. When the system includes a video amplifier, the magnitude of this undesirable phase shift has been alleviated by increasing the bandwidth of the video amplifier; and in a cathode ray tube type display, the phase shift may be compensated for by displacing the electron beam the appropriate amount during the dead time utilized for interlacing. Nevertheless, for a display using light emitting diodes and visible energy optics to bring the energy to a focus in the observer's eye, it has not been possible to produce an image void of the phase shift defect; such a scanner is disclosed in U.S. Patent Application, Ser. No. 097,753, filed Dec. 14, 1970, for "A Two Axes Angularly Indexing Scanning Display" by Richard G. Hoffman II (TI-4217).

Accordingly, it is an object of this invention to produce an improved scanning system.

Another object of the present invention is to provide a scanning system which produces an improved visual image.

Still another object of this invention is to provide a scanning system which compensates for the effect of electronic phase shift in the displayed image.

Yet another object of this invention is to provide a scanning system having a means for eliminating the effect of electronic phase shift in the displayed image which is small in size, weight, and complexity and which is of high reliability.

Briefly stated the embodiment of this invention comprises displacing a lens in a direction perpendicular to its optical axis to adjust the image formed by the lens system to compensate for electronic phase shift. In the radiant display system, such as, for example, that disclosed in U.S. Patent Application, Ser. No. 097,753, filed Dec. 14, 1970, which has an interlacing mechanism, a line image appears as a dotted line with the dots offset laterally a fixed distance on each side of a reference line position. For correcting electronic phase shift in an image, the angular correction required is made equal to the distance the lens moves divided by the lens focal length. Thus, either the focal length of the lens may be used as the variable to equate the angular correction to offset distances thereby providing compensation for the electronic phase shift or the distance between the lens and the interlace axis may be varied or both means may be combined to provide the correction as will be explained in detail hereinafter.

Other objects and features of the invention will become more readily understood from the following detailed description and appended claims when read in conjunction with the accompanying drawings, in which like reference numerals designate like parts throughout the figures thereof, and in which:

Figure 1:
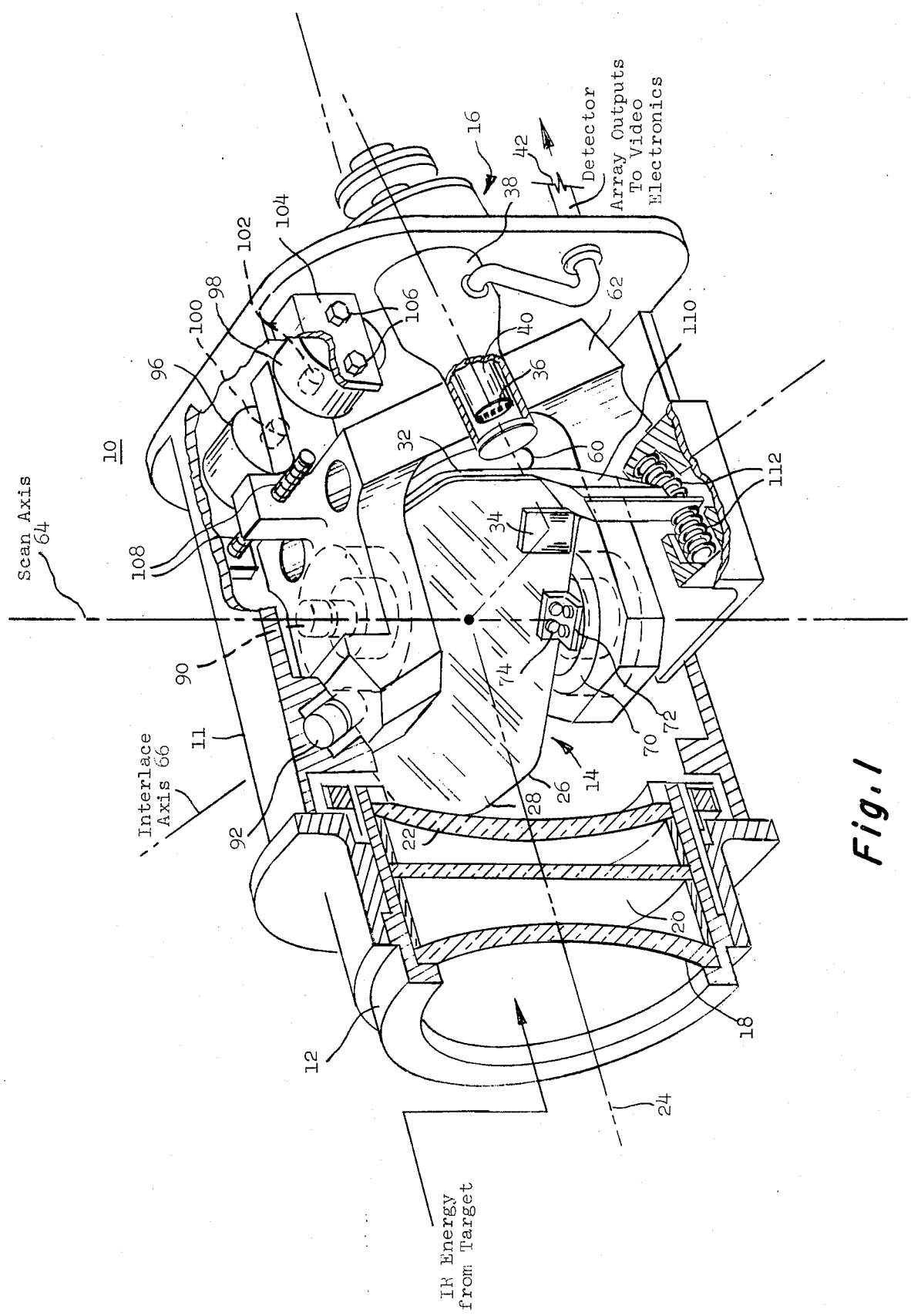
FIG. 1 is an isometric view of the radiant energy display system upon which the present invention may be practiced.

Referring now to FIG. 1 a radiant energy display system in accordance with the invention of co-pending Patent Application, Ser. No. 097,753, filed Dec. 14, 1970, is disclosed. The radiant energy display system is indicated by the reference numeral 10 and is packaged within housing 11. This radiant energy display system converts incoming radiant energy into visible light. Thus, if the detector array in the system is sensitive to invisible electromagnetic radiation, such as infrared radiation, and the light source of the display system produces visible light, an invisible infrared image can be converted to a visible light image which can be viewed by the human eye or processed as desired. For purposes of explanation, it will be assumed that the incoming radiant energy is in the infrared region of the spectrum.

The infrared receiver portion of the display system is comprised of a lens assembly 12, a scanning assembly 14, and a detector assembly 16. The lens assembly 12 is comprised of three lens elements which, for operation in the infrared region, may consist of three germanium elements, 18, 20, and 22. Incoming infrared energy from a target (not shown) enters the optical axis 24 of the system, passes through lens assembly 12 and impinges upon the scanner assembly 14. The scanner assembly is comprised, in part, of a two sided flat mirror 26 with the front side 28 of the mirror being utilized for the reception of infrared energy while the back side 30 of the mirror is utilized for scanning the modulated visible light from a light source to be described hereinafter. Scan mirror 26 is mounted for rotation on mirror mount 32 and is positioned nominally at an angle of 45° to optical axis 24. The incoming radiant energy is reflected from scan mirror 26 and in turn impinges upon a folding mirror 34. Folding mirror 34 reflects the energy and focuses the energy on a linear array of detectors 36 which are located in a Dewar 38 for cooling the individual detector elements. Dewar 38 is located on the infrared side of scanning mirror 26 along the folded optical axis 24.

Detector 36 may comprise of the plurality of infrared detectors which may be, for example, in a linear array and made of spaced mercury cadmium telluride (HgCdTe) diodes or indium antimoide (InSb) diodes. The individual detectors may also be staggered, by further way of example. The particular material used for the detectors will be dependent upon the infrared spectrum to which the system is designed to be responsive. For example, the detector array 36 may be composed of 0.003 by 0.003 inch detector elements in a linear array which are separated by 0.003 inch. These detectors can operate at liquid nitrogen temperatures (77°K). The Dewar contains a cryostat 40 which is connected to a source (not shown) of high pressure nitrogen gas. This gas undergoes a pressure change which cools the gas causing the gas to condense to a liquid at 77°K at or near detector array 36. This increases the sensitivity of the detector array 36. A suitable cryostat is manufactured and sold by Air Products Incorporated.

Figure 2:
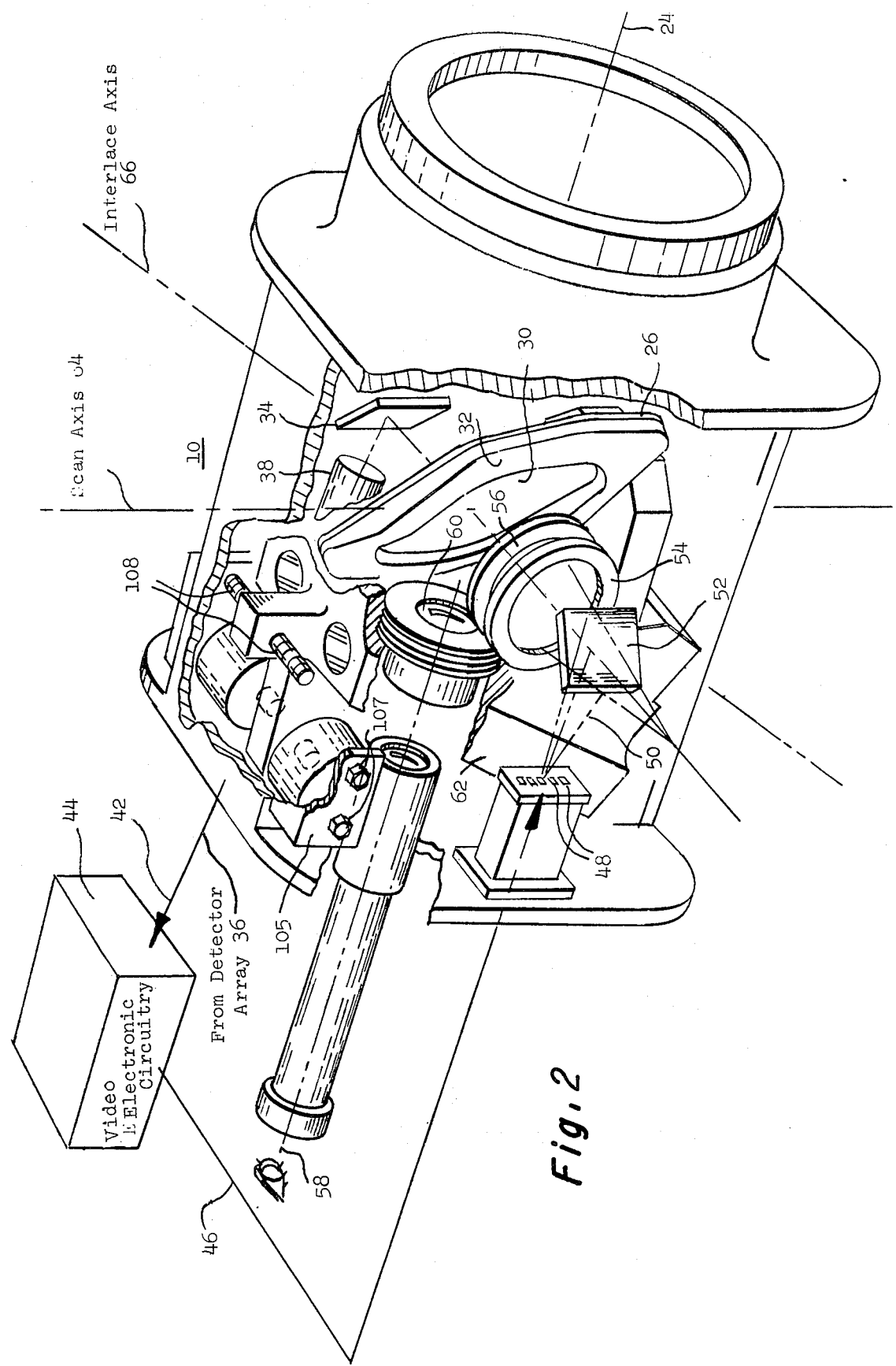
FIG. 2 is a schematic showing in part an isometric view of the radiant energy display system having a part of the housing broken away to disclose the embodiment of the present invention.

FIG. 2 illustrates the display portion of the system 10. The output of the detector array 36 is fed to the video electronics circuitry 44, the output 46 of which is fed to light source 48. The light source may comprise, for example, a plurality of space light emitting diodes. The number of light emitting diodes 48 will correspond in number to the number of detectors in the linear array of detectors 36 with similar spacing therebetween. The video electronics 44 couples each detector channel with the corresponding light emitting diode 48 and provides the signal processing and auxiliary functions to modulate the output of each light emitting diode. The visible light output 50 from light emitting diodes 48 impinges upon folding mirror 52 where it is reflected through collimating lens elements 54 and 56 to the back surface of scan mirror 26. The light emitting diode array 48 may be composed of, for example, gallium arsenide phosphide diode elements such as the type manufactured and sold by Texas Instruments Incorporated. The visible representation of the target is reflected from the back portion 30 of scan mirror 26 through a lens 162 threadedly mounted in the gimbal or link member 62. The lens 162 furnishes an image for an erect image telescope 164 positioned in the line of sight for an observer. The utilization of the same scan mirror 26 for both the receiver scan and the display scan allows for cancellation of small perturbation of mirror motion during the scanning cycle; while the utilization of lens 162 threadedly mounted in the gimbal member 62 permits adjustment of the distance from the interlace axis 66 so that movement of the gimbal member 62 correspondingly moves the lens 162 to correct the resulting image for electronic phase shift, i.e., shift in visual signal which results from the finite time required to process the visual image from the detected infrared signal.

Figure 3:
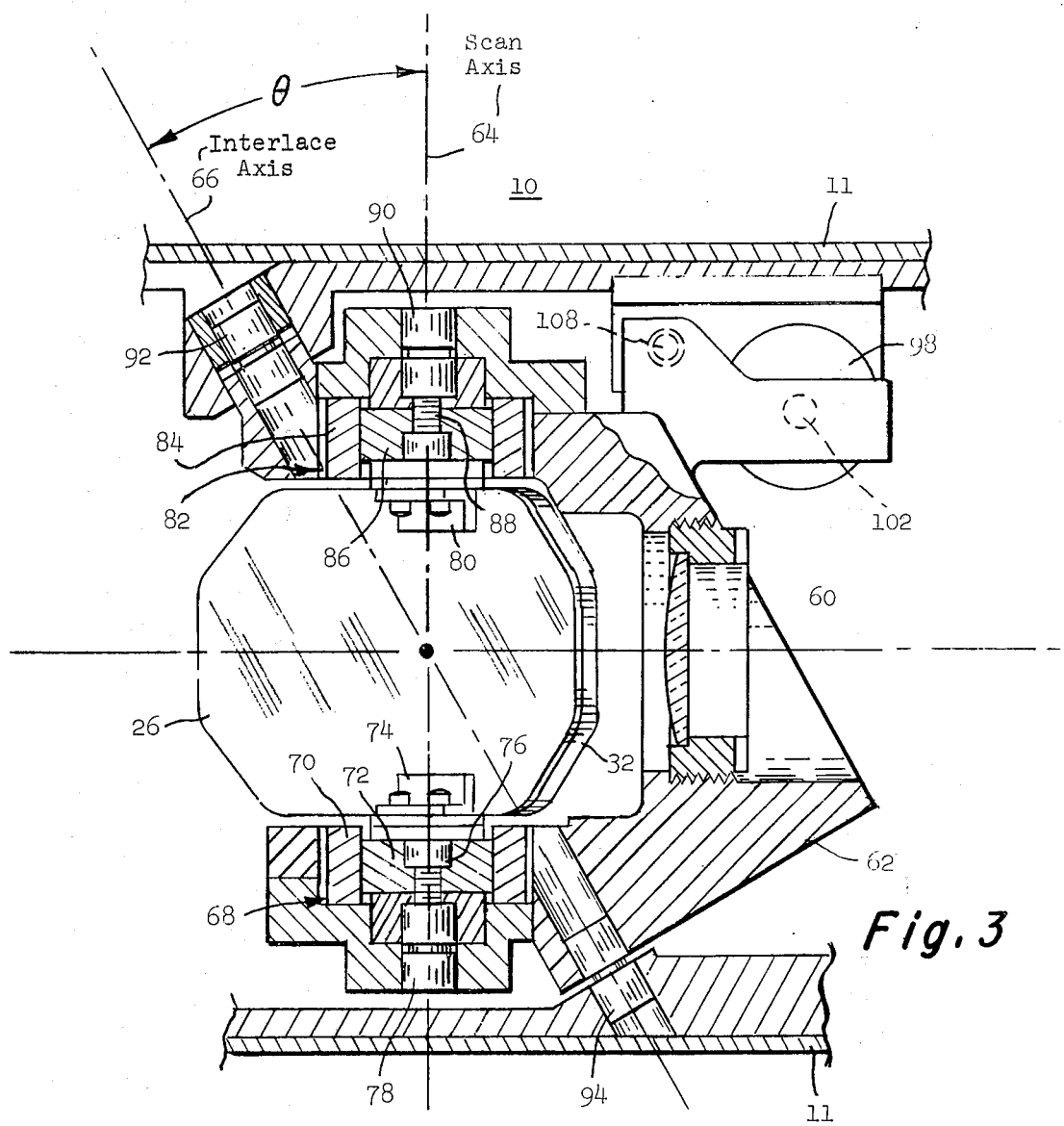
FIG. 3 is a cross-section of the scanner and driver portion of the display system.

Referring now specifically to FIG. 3, it will be seen that the scan mirror 26 moves about a first and second axes; namely, the scan axis 64 and the interlace axis 66. Interlace axis 66 is positioned at an angle $\theta$ which is less than 90° from scan axis 64. As mentioned previously, scan mirror 26 is mounted at an angle of approximately 45° to the optical axis 24. The scan mirror provides the scanning for both the receiver portion and the display portion of the system 10. Vertical scan and display are effectively provided by using vertically oriented linear arrays of infrared detectors 36 and light emitting diodes 48. These elements are spaced such that a 2:1 interlace, obtained by moving the scan mirror a few milliradians about interlace axis 66, allows a 2:1 reduction in the number of channels required in the system 10.

Horizontal scanning of the mirror 26 occurs about scan axis 64. Typically, scan mirror 26 is rotated 7.5° on either side of scan axis 64 for a total horizontal scan of 15°. The scan mirror may rotate at a constant velocity during the 15° horizontal scan, which will occupy typically 80% of the cycle time period. Twenty percent of each time period (referred to as the dead time) may be allotted for reversing the scan mirror direction of rotation. Tilting the mirror for the interlace (to be described in more detail hereinafter) will also occur during the dead time. Mirror 26 is mounted on a gimbal or link member 62. A small, brushless d.c. torque motor provides the drive function around scan axis 64. The torque motor 68 is comprised of a stator 70 and a rotor 72. Integral with the rotor 72 is mirror clamp 74 which clamps mirror 26 to rotor 72. Threaded coupling 76 secures rotor 72 to bearing or flex pivot 78.

Figure 12:
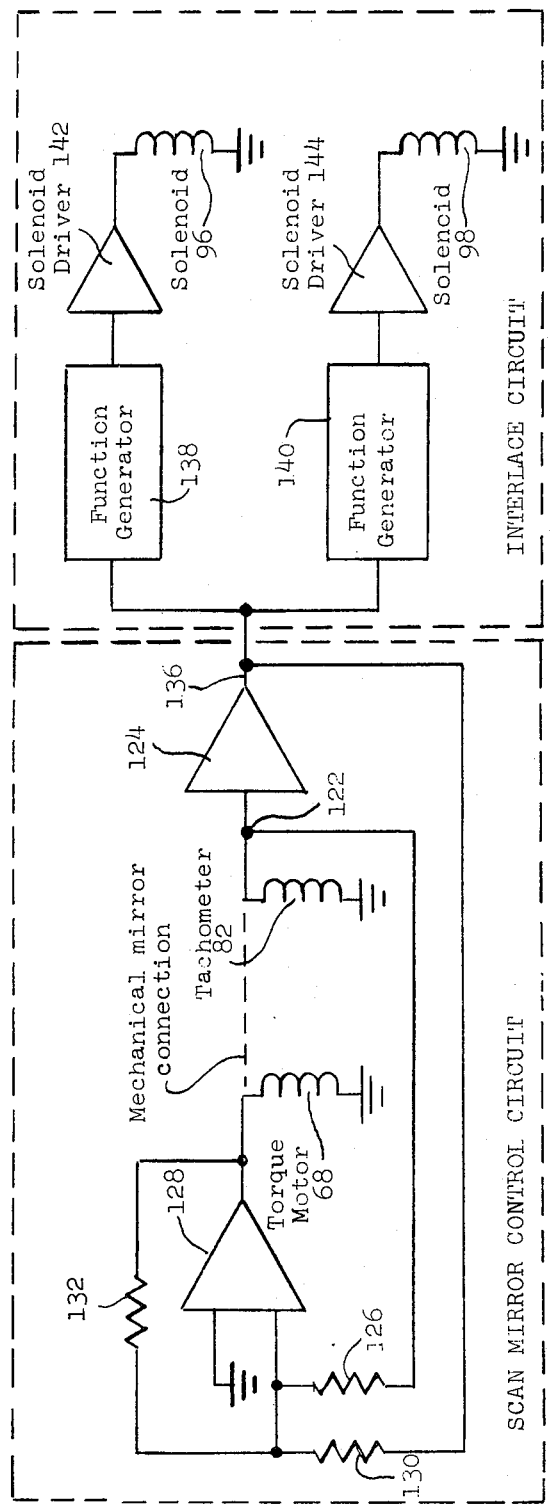
FIG. 12 is a schematic of the scan mirror control and interlace circuits.

The mirror is attached at its upper end by way of mirror clamp 80 to a tachometer 82 which provides a feedback signal which is used for rate sensing (and described further with regard to FIG. 12). Tachometer 82 is comprised of a stator 84 and rotor 86 to which mirror clamp 80 is mounted. Threaded coupling 88 holds rotor 86 in engagement with the bearing of flex pivot 90. Torque motor 68 which provides the horizontal scan motion for mirror 26 may be considered the scan driver. Torque motor 68 may be, for example, Model No. TQ10Y-10P manufactured and sold by Aeroflex Incorporated.

Figure 4:
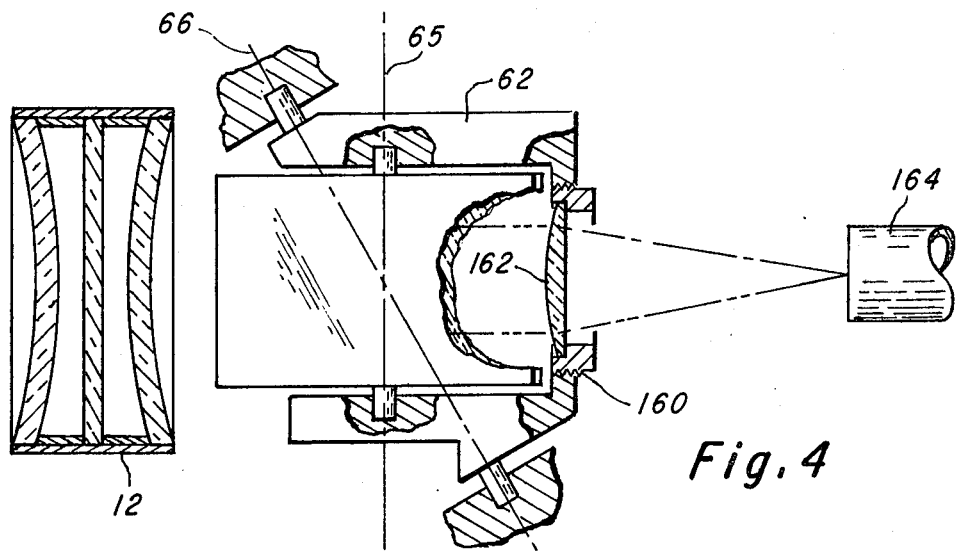
FIG. 4 is a side view taken partly in section to show the embodiment of the present invention.

Gimbal or link member 62 is provided with a threaded aperture 160 (FIG. 4) into which the lens 162 mounted in a suitable frame 162 having a threaded periphery may be threaded to secure in an adjustable manner the lens in the threaded aperture 160 of the gimbal 62. Gimbal or link member 62 may be moved or tilted at a predetermined time in the scanning cycle (i.e. during the dead time of the scan cycle) around interlace axis 66. Link 62 (FIG. 3) is mounted to the housing 11 by way of two bearings or flex pivots 92 and 94. These flex pivots, consisting of cross-leaf springs, are characteristically rugged, have low friction and are of light weight. Flex pivots 92 and 94 (FIG. 3) allow link 62 (and therefore mirror 26) to move or tilt around interlace axis 66. Solenoids 96 and 98 provide the interlace drive motion and allow the gimbal or link 62 and mirror 26 to tilt about the interlace axis upon actuation of either solenoid 96 or 98. When solenoid 96 or 98 is actuated, shafts 100 and 102 respectively will pull link 62 thereby causing the link to tilt about the interlace axis a prescribed amount (in order of a few milliradians). Solenoid 98 is mounted to bracket 104 by bolts 106 while solenoid 96 is mounted in the same manner by bracket 105 and bolts 107 (FIG. 2). Stops 108 limit the motion of solenoids 96 and 98.

In FIG. 1, it will be noted that an extension 110 is attached to mirror mount 32 and is positioned between two "tuned" restoring springs 112. These restoring springs 112 provide a significant portion of the torque required to turn around scan mirror 26 with the mirror torque mirror drive 68 supplying the remainder and also making up for losses in the bearings and springs.

It should be noted that although a separate scan drive (torque motor 68) and interlace driver (solenoids 96 and 98) are illustrated in FIGS. 1 and 3, in some applications, a single driver may be utilized to obtain the desired scan and interlace motion of scan mirror 26. If a scan driver only is utilized to apply a torque $T_s$ to scan axis 64, a component of that torque will be applied to interlace axis 66 related to $T_s$ by cos $\theta$, where $\theta$ is the angle between the interlace and scan axes. This torque then accomplishes the interlace function. If an interlace driver only is utilized to apply a torque to link member 62 and the link acquires an angular velocity, then the scan axis (which is integral with the scan mirror) will obtain that same angular velocity and the component of that angular velocity along the scan axis appears as a change in the scan rate of the mirror with respect to the housing causing the scan motion. A single driver to accomplish movement of mirror 26 may be obtained without the necessity of additional power transmission devices.

Figure 5:
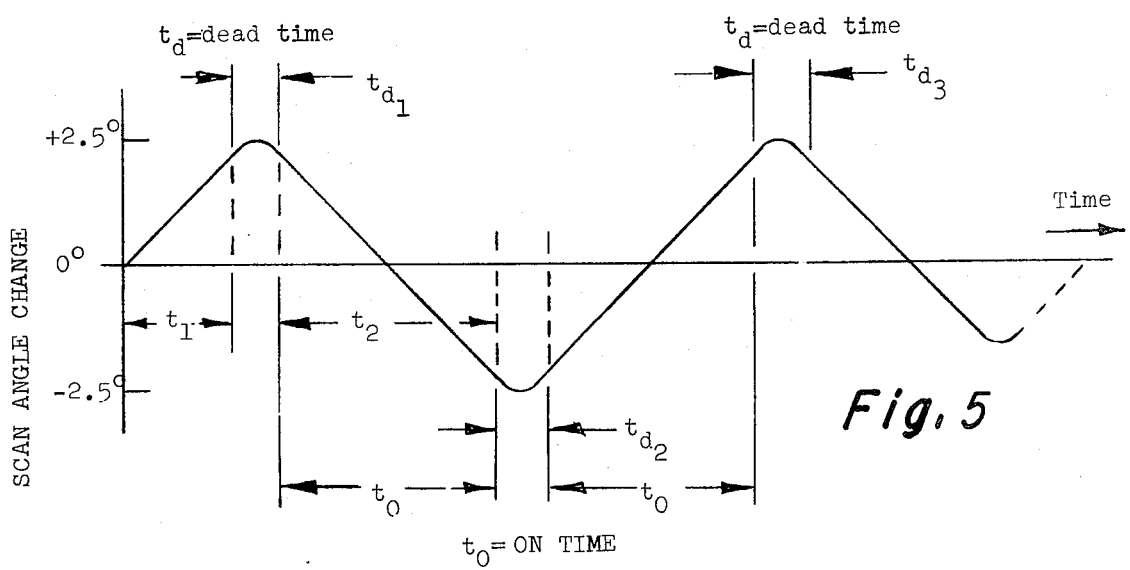
FIG. 5 illustrates the scan angle change as a function of time.
Figure 6:
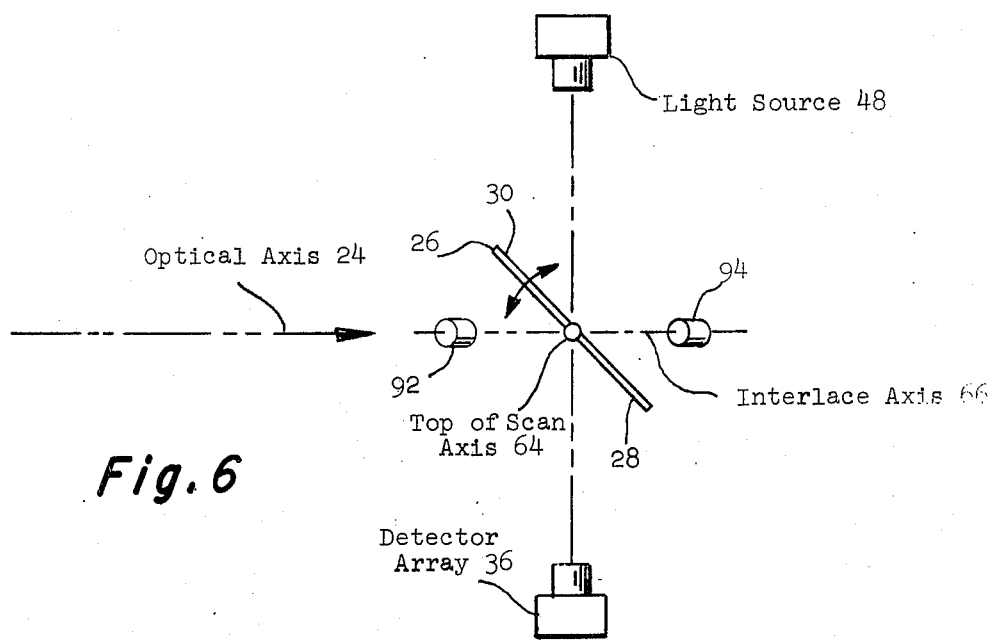
FIG. 6 is a top view of FIG. 3 depicting the relationship between the various axes and the scanner reflecting surface.

The system illustrated in FIGS. 1 and 3 is essentially an image plane scanner; by that, it is meant that the target in the object plane (not shown) remains fixed with respect to the aperture of the system while the image of that target is scanned across detector array 36. FIG. 5 illustrates the relationship between the scan angle change of mirror 26 with time while FIG. 6 illustrates a top view of FIG. 3 showing the relationship between the three axes, 24, 64, and 66 with scan mirror 26. As will be noted from FIG. 5, scan mirror 26 rotates 7.5° from its 0° position which is nominally at the 45° angle with the optical axis 24. In other words, scan mirror 26 will move through an angle between 37.5° and 52.5° with respect to the optical axis 24 as can be seen in FIG. 6. As designated in FIG. 5, the time required for mirror 26 to move ±7.5° corresponds to the "on" time, $t_o$, while the time required for scan mirror 26 to index or tilt (interlace) is designated as the "dead" time $t_d$. The "on" time of the scanner may be approximately 80% while the dead time may be on the order of 20% of the total duty cycle of the scanner. It will be noted from FIG. 5 that a linear scan (constant angular velocity or scan rate) is utilized during the on time of the scanner. A sinusoidal scan motion could have been used but the variation in target dwell time (i.e., the time period that the image of a resolution sized target is over an individual detector) with scan angle would result in varying gain across the display image. The dead time ($t_d$) of each time period is allotted for reversing the direction of rotation of scan mirror 26 and further for tilting mirror 26 for interlace.

FIGS. 7-11 illustrate in detail the scanning and interlace action. As has been noted previously, detector array 36 consists of a plurality of individual detector elements in a linear array each spaced one detector width away from the next element. The number of light source elements in light source 48 corresponds to the number of elements in detector array 36 with substantially the same spacing therebetween. In other words, by not using a continuous row of elements, that is, using only one-half that number, the number of detector channels is reduced by one-half as well as the associated video electronic circuitry 44, thereby requiring half the number of light source elements 48. FIGS. 7-11 have removed certain elements illustrated in FIGS. 1 and 3 for purposes of clarity. For example, folding mirrors 34 and 52 are not shown and the radiant energy impinging upon mirror 26 is shown in FIGS. 7-11 as impinging directly upon detector array 36.

Figure 7:
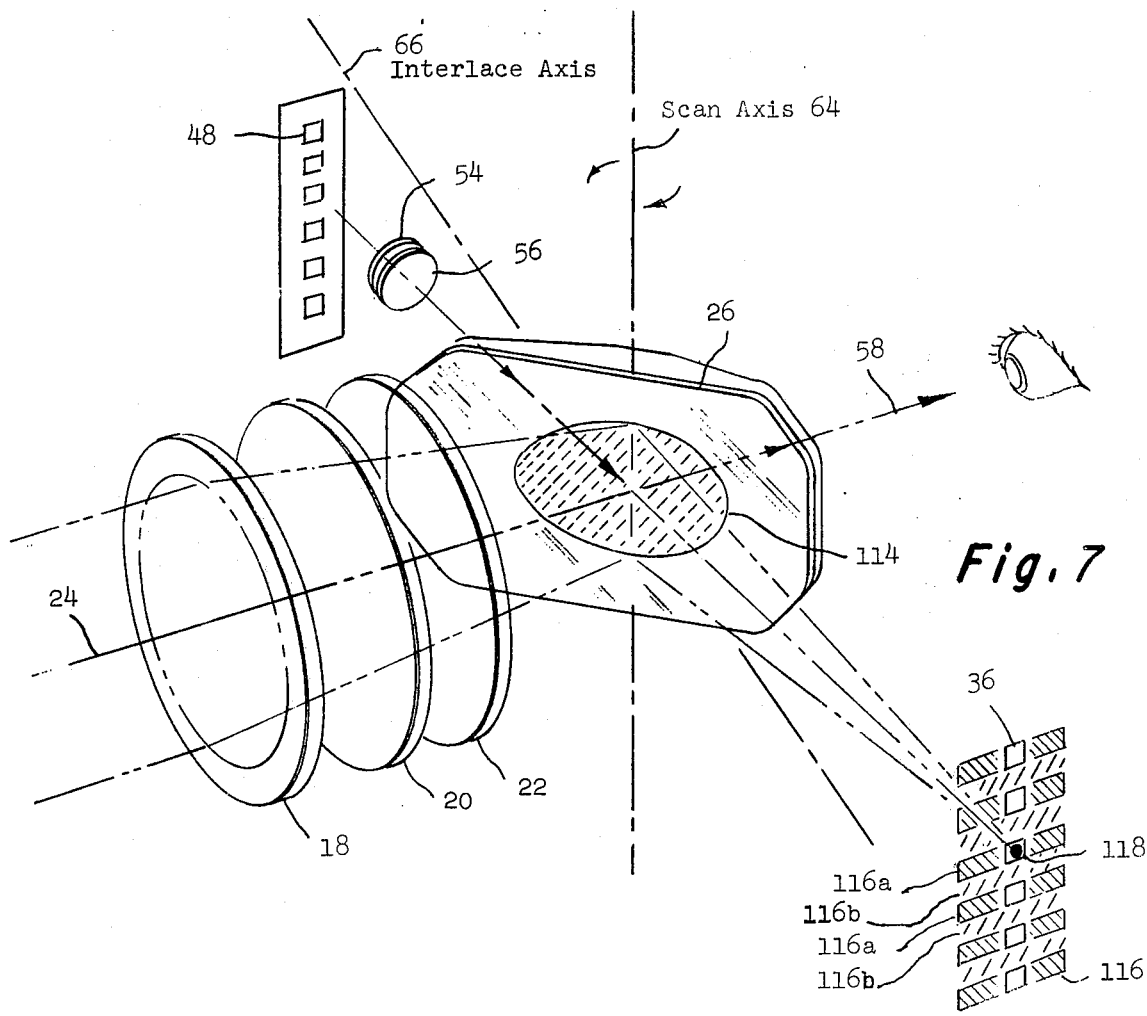
FIGS. 7–11 illustrate a scanning and interlace action according to the present invention.

FIG. 7 illustrates the scanning mirror 26 at nominally a 45° angle to optical axis 24. For purposes of explanation, incoming radiant energy passes through lens elements 18-22 and impinges upon mirror 26 at 114. This energy (which is assumed to be infrared energy) is reflected from mirror 26 and impinges upon detector array 36. The image of the target (not shown) is bounded by the area 116 which partially overlays detector array 36. It will be noted that the area 116 of the target may be broken into two groups of rows of information 116a and 116b. In the position illustrated in FIG. 7, rows 116a will overlay the individual detector elements 36 while rows of information 116b do not overlay any individual detector elements. Accordingly, the information contained in rows 116b will now be obtained during the first sweep of mirror 26. The image point on optical axis is shown on a detector as resolution element 118.

Figures 8, 9:
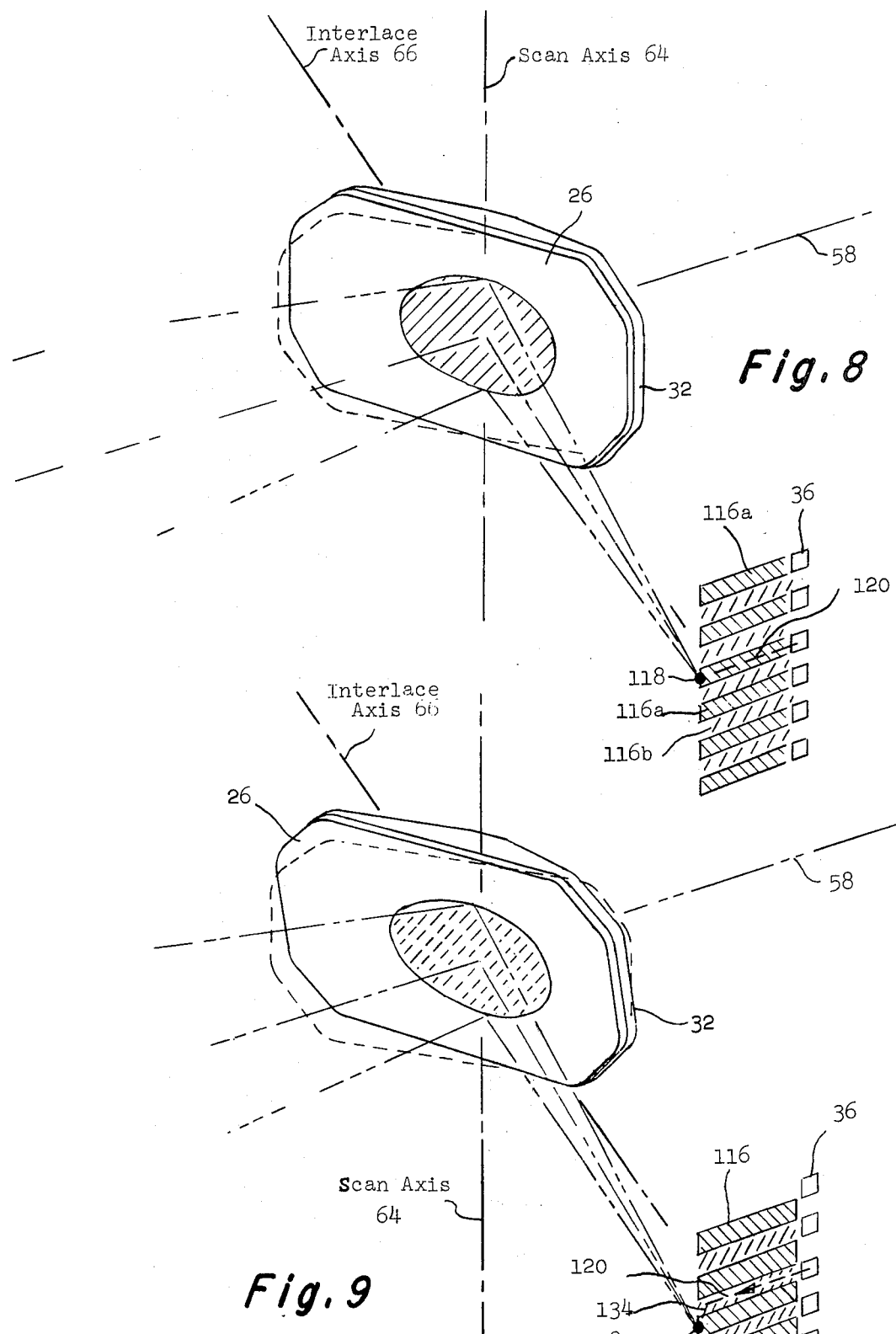

Referring now to FIG. 8, it will be seen that mirror 26 is moved 7.5° from its position shown in FIG. 7. The original position of the scan mirror shown in FIG. 7 is dotted in FIGS. 8-11, for reference purposes. This 7.5° excursion of scan mirror 26 corresponds to the time $t_1$ shown in FIG. 5. The information contained in rows 116a scans over the individual detector elements 36 and the path traversed during the scan by individual resolution element 118 is shown as path 120. As mirror 26 moves to the position shown in FIG. 8, it will impact one of the two restoring springs 122 (FIG. 2) which will help it reverse its direction. This reversal of direction, as well as the indexing or interlacing of mirror 26, occurs during the first dead time illustrated in FIG. 5 as $t_{d_1}$.

FIG. 12 illustrates the scan mirror control and interlace circuit used to drive torque motor 68 and solenoids 96 and 98 (shown in FIG. 2). Torque motor 68 drives scan mirror 26 through the ±7.5° scan. Tachometer 82 (shown in FIG. 3 and schematically in FIG. 12) is mechanically coupled to torque motor 68 and the tachometer electrical output 112 is fed to an inverting amplifier 124 as well as through resistor 126 back to one input of comparator 128. The output of inverting amplifier 124 is fed through resistor 130 to the same input of comparator 128 as resistor 126 while resistor 132 is also fed to this common terminal. The other side of resistor 132 is connected to the output of comparator 128. Comparator 128 provides a drive and a d.c. reference voltage whose polarity depends upon the scan direction. Resistor 130 determines the scan velocity and period. In other words, the scan mirror control circuit of FIG. 12 provides the appropriate voltage to torque motor 68 during the on time of the scanner.

FIG. 9 illustrates the index and tilting of mirror 26 during the dead time $t_{d_1}$. It will be noted from FIG. 9 that target area 116 is effectively moved down, with respect to the individual detectors indexed or interlaced one detector width. In other words, row 116a is no longer in line to pass over one of the detector elements 36 while row 116b is now in a position to pass over one of detector elements 36. This is shown more clearly by the path 134 traversed by resolution element 118. Mirror 26 to effect this interlace, is moved or tilted a predetermined amount around interlace axis 66. This movement is generated by solenoid 96 activating shaft 100 (FIG. 2).

The interlace circuit shown in FIG. 12 activates solenoids 96 and 98 at the appropriate time. The interlace circuit electrically activates solenoid 96 during dead time $t_{d_1}$ (FIG. 5). A timing signal 136 from amplifier 124 in FIG. 12 is connected to function generators 138 and 140 which, in turn, are respectively connected to solenoid drivers 142 and 144. The timing signal 136 actuates function generator 138 which applies to solenoid 96 an acceleration, deceleration and hold signal for a predetermined time period. Solenoid 96 pulls shaft 100 which rotates or tilts link member 62 around interlace axis 66.

Figures 10, 11:
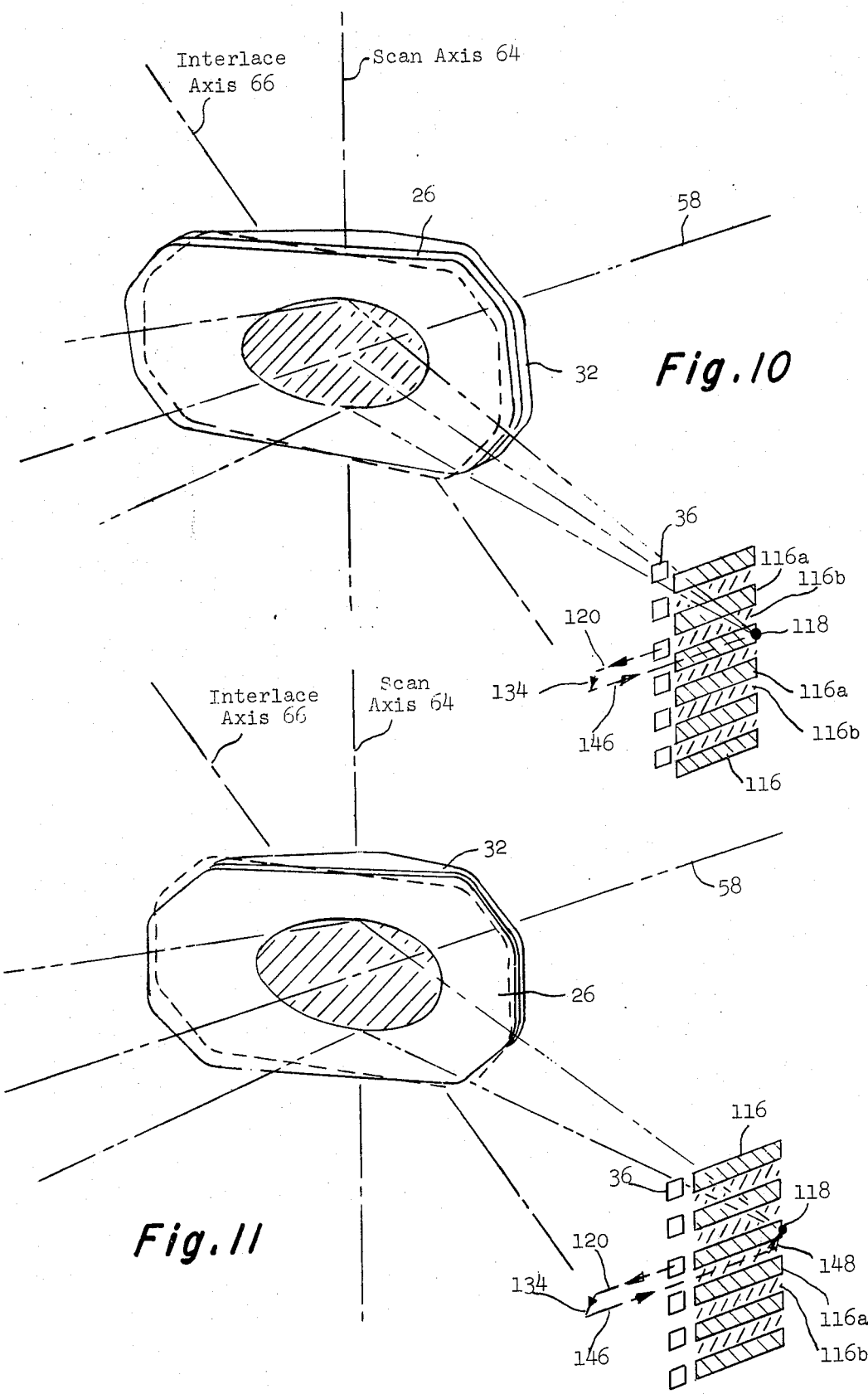

FIG. 10 illustrates the scan by mirror 26 as it moves through the 15° scan in FIG. 3 as shown at time $t_2$, in the tilted or interlaced position. In this position, resolution element 118 will traverse a path shown at 146. Scan mirror 26 in traversing the path 146 will scan in the opposite direction from path 120.

FIG. 11 illustrates the position of the scan mirror after it has been indexed or interlaced during the dead time $t_{d_2}$(FIG. 5). During this time period, the row 116a of target information is once again in a position to be scanned across the individual detector elements 36 while the row 116b of target information will not be scanned across any detector elements. Resolution element 118 traverses a path 148 during the interlacing time period $t_{d_2}$. During this time period $t_{d_2}$, the timing signal 136 shown in FIG. 12 actuates function generator 140 which, in turn, excites solenoid 98. Solenoid 98 pulls shaft 100 which tilts link or gimbaled member 62 around interlace axis 66 in the opposite direction than that provided by solenoid 96 and shaft 100.

Thus, it can be seen that when mirror 26 completes a full cycle, an exemplary resolution element 118 will traverse essentially a parallelogram whose sides are made up of paths 120, 134, 146, and 148. Paths 120 and 146 are perpendicular to scan axis 64 while paths 134 and 148 are perpendicular to interlace axis 66.

Figure 13:
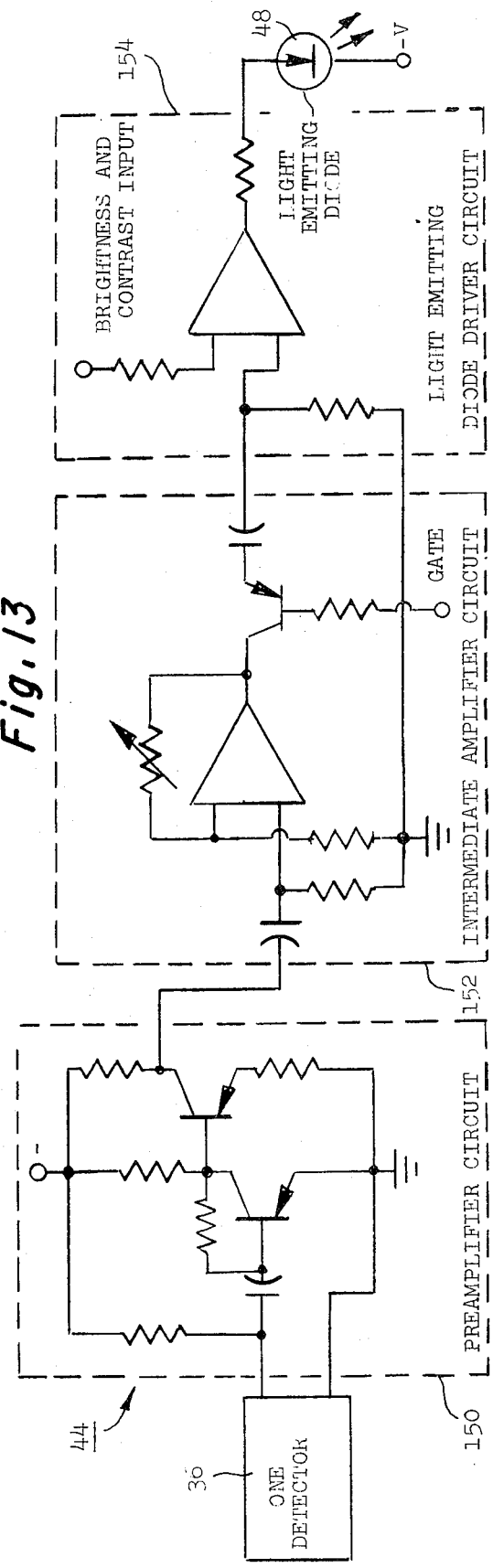
FIG. 13 is the schematic of one video electronic channel.

By the interlace method described herein, the total image of the target arm 116 is traversed across detector elements 36 when scan mirror 26 completes one cycle of operation. By utilizing this interlacing technique, that is tilting mirror 26 about interlace axis 66 during the dead time $t_d$, only one-half the number of detector elements are required, compared with the no interlace situation. After the target is scanned across detector array 36 as described hereinabove, appropriate video electronic circuitry 44 (shown in block form in FIG. 2) processes the detector information and modulates the light source array 48. Video electronic circuitry 44 couples each detector element in array 36 with the corresponding light emitting diode element in light array 48. As shown in FIG. 13, the output of one detector element in array 36 goes through preamplifier circuit 150 and then through an intermediate stage of amplification in amplifier circuit 152. The output from the second stage 152 of amplification is then in turn coupled to the light emitting diode driver circuit 154 which modulates the light output from light emitting diode element 48. Light emitting diode drive circuit 154 will provide a current through light emitting diode element 48 which is a function of the amount of radiant energy impinging upon detector element 36.

Figure 14:
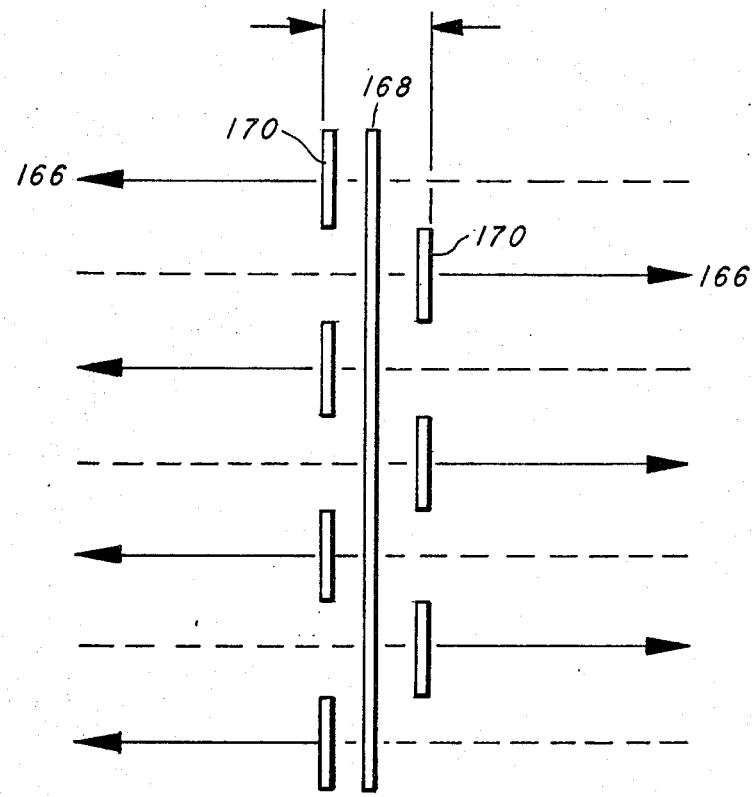
FIG. 14 is an elevational view of a line image produced by an interlacing type scanner without the embodiment of the present invention.
Figure 15:
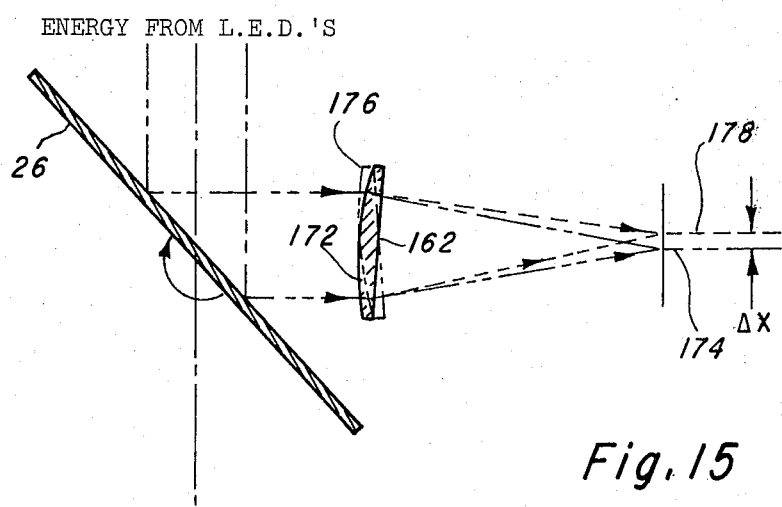
FIG. 15 is a top view of the embodiment of the present invention with the gimbal omitted for clarity.

As shown in FIG. 2, the visible light output 50 from light emitting diodes 48 is reflected from folding mirror 52, transmitted through collimating lens elements 54 and 56 and is transmitted to the back portion 30 of scan mirror 26. The visible light transmitted from the back portion 30 of mirror 26 will be scanned and interlaced in the same manner as described hereinabove with regard to the incoming radiant energy impinging on the front portion 28 of mirror 26 to form a visible image. For this reason, no synchronization is required between the receiver scan gathered on the front portion 28 of mirror 26 and the display scan generated upon the back portion 30 of mirror 26. In other words, the utilization of the same scan mirror 26 for both receiver scan and display scan allows for cancellation of small perturbations of mirror motion during the scanning cycle shown in FIG. 5. The visible image which may be viewed by an observer along the line of sight axis 58 in FIG. 1 is a visual representation of the incoming infrared energy. Nevertheless, the image produced by the device of FIG. 1 produces a jagged, dotted image. If a line, for example, is used as the object, the image is as shown in FIG. 14. In FIG. 14, the arrowheads 166 indicate the direction of scan of each line, the vertical line 168 intermediate the rows of elongated blocks 170 indicates the reference point position of the line, and the elongated blocks 170 represent the displayed image of the line. The elongated blocks 170 indicate the observed line position. By adjusting the lens 162 (FIG. 4) by moving it in or out the threaded aperture of the gimbal 62 to vary the distance between the lens 162 and the interlacing axis 66, the elongated blocks (FIG. 13) of every other line beginning with the second line can be made to appear in line with the elongated block of every other line beginning with the first line. This alignment results because the lens upon scanning in the first direction locates a portion of the line image to the left of the reference line, and with the interlace movement at the end of the first movement the lens is properly positioned so that scanning in the second direction moves the elongated blocks into alignment with the elongated blocks as they appear during mirror movement in the first scan direction. At the end of the scan in the second direction, the interlace movement returns the lens to its original position for movement in the first direction again. FIG. 15 demonstrates the effect upon the image of the component of the lens movement parallel to the scan direction. This movement is generated by rotation of the lens about the interlace axis. Lens position 172, shown in dotted lines, shows the position of the image 174 before gimbal rotation about interlace axis; lens position 176, shown in solid lines, shows the position of the image 178 after gimbal rotation about the interlace axis. The distance $\Delta x$ is twice that resulting from the electronic phase shift; thus, the resulting corrected image is therefor either on the left or right side of the solid line reference line position (FIG. 14) depending on the direction of initial scan. This small deviation may be compensated for, when required, during bore sighting of the instrument on which the scanning device is used. Accordingly, this radiant energy display system will not only convert visible radiant energy to a visible analog of that radiant energy, but it will enhance image resolution.

Although a preferred embodiment of the invention has been described in detail, it is to be understood that various changes, substitutions and modifications of the invention may be suggested to one skilled in the art, and it is intended to encompass such changes, substitutions or modifications which do not depart from the spirit and scope of the invention.

What is claimed is:

1. An apparatus for scanning radiant energy comprising:
   a. a radiant energy reflecting surface mounted for movement about a first and second axes, said first axis located less than 90° from said second axis;
   b. means for rotating said radiant energy reflecting surface about said first axis, and for rotating about said second axis and for counter rotating said reflecting surface about said first axis;
   c. detector means for receiving the radiant energy from said reflecting surface and producing an output signal that varies with the radiant energy incident thereon;
   d. light source means responsive to said output signal for producing a visible light beam representative of said radiant energy, said visible light beam being scanned on the back surface of the radiant energy reflecting surface; and
   e. means in the line of sight path to the back surface of the radiant energy reflecting surface operatively responsive to movement of the second axis for correcting lateral displacements appearing in the visible image produced by the radiant energy display system.

2. A radiant energy display system according to claim 1, wherein said means responsive to the movement of the second axis for correcting lateral displacements appearing in the visible image comprises a lens.

3. A radiant energy display system according to claim 1, wherein said radiant energy reflecting surface is gimbal mounted to provide a scanning movement about the first axis and an interlacing movement about the second axis in a direction less than 90° to the scanning movement, and wherein said means for correcting the lateral displacements of the visual image is a lens mounted in the line of sight path to the back surface of the radiant energy reflecting surface operatively responsive to movement of the gimbal providing the interlacing movement.

4. An apparatus for scanning radiant energy according to claim 3, wherein said lens is supported by the gimbal means producing the interlacing movement.

5. An apparatus for scanning radiant energy according to claim 4, wherein said lens mounted in the line of sight path to the back surface of the radiant energy reflecting surface is adjustably mounted in the gimbal means producing the interlacing movement.

6. An apparatus for scanning radiant energy comprising:
   a. a mirror having a radiant energy reflecting surface positioned to receive radiant energy, and a light reflecting surface positioned to receive visible light energy;
   b. electronic means operatively responsive to radiant energy reflected from the radiant energy reflecting surface of the mirror for producing on the rear side of the mirror a visible light image indicative of the reflected radiant energy;
   c. a gimbal means pivotally supporting the mirror for movement in a scanning direction;
   d. a gimbal support means including a pivotal support for said gimbal means, said pivotal support forming an interlace axis disposed less than 90° to the scanning axis; and
   e. a lens member supported by the gimbal support means in the line of sight path to the rear side of the mirror for movement corresponding to the gimbal interlace movement for correcting lateral displacements appearing in the visual image as a result of electronic phase shift.

7. An apparatus for scanning radiant energy according to claim 6, wherein said lens is threadedly mounted in the gimbal support means for adjusting the distance between the lens and the interlace axis for correcting lateral displacements appearing in the visual image as a result of electronic phase shift.

* * * * *